Feb. 3, 1925.
R. VARLEY
ELECTRIC CONTROLLING DEVICE FOR AUTOMOBILES
Filed March 25, 1921    3 Sheets-Sheet 1

1,525,420

Richard Varley,
Inventor
By his Attorneys
Kerr, Page, Cooper & Hayward

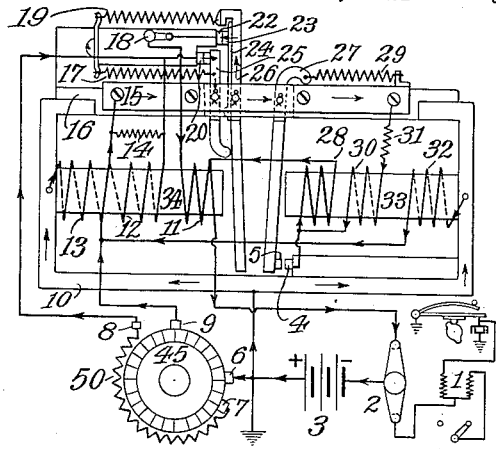
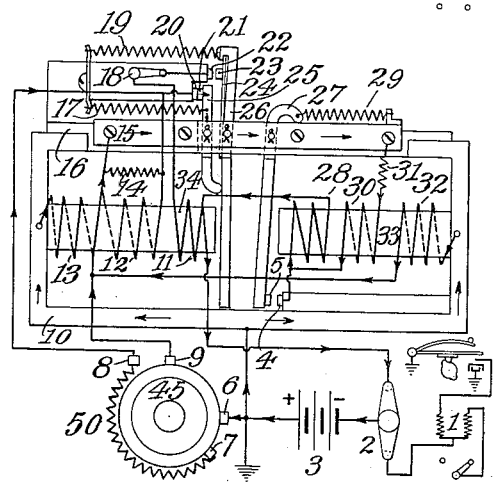
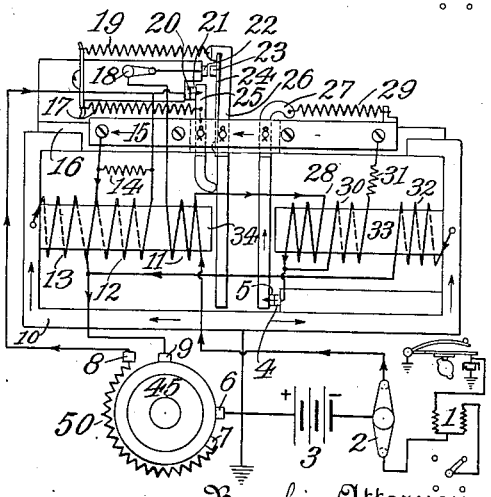

Feb. 3, 1925.
R. VARLEY
1,525,420
ELECTRIC CONTROLLING DEVICE FOR AUTOMOBILES
Filed March 25, 1921   3 Sheets-Sheet 3
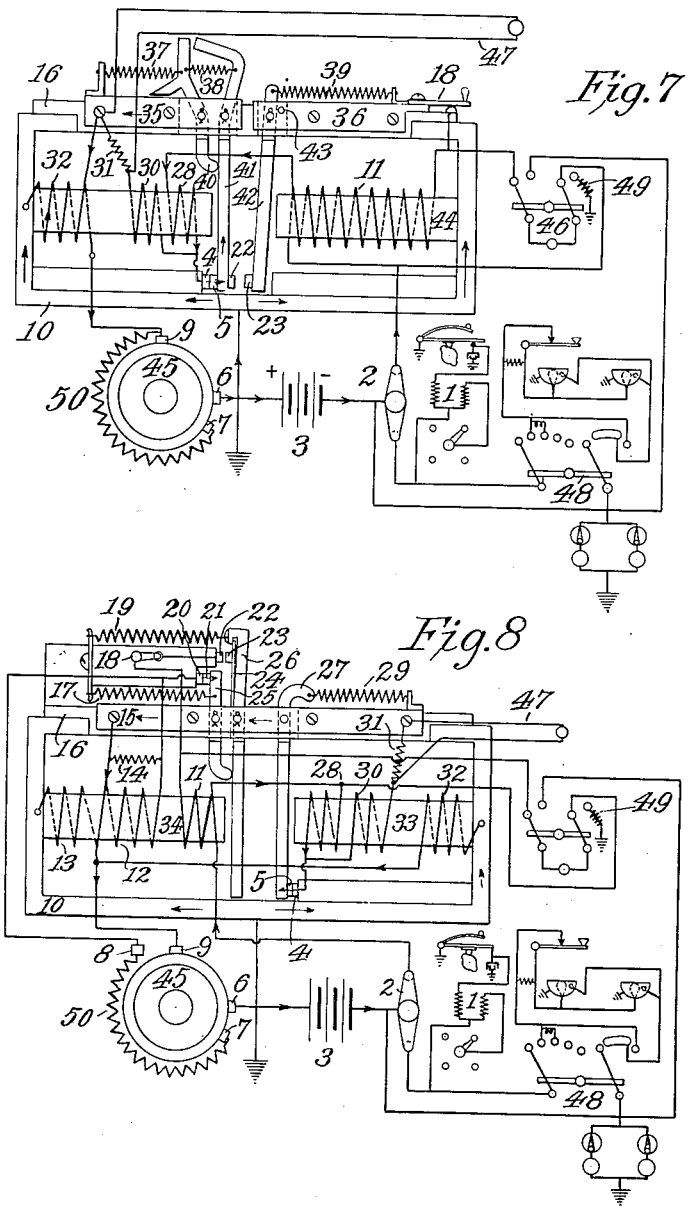

Patented Feb. 3, 1925.

1,525,420

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

ELECTRIC CONTROLLING DEVICE FOR AUTOMOBILES.

Application filed March 25, 1921. Serial No. 455,398.

*To all whom it may concern:*

Be it known that I, RICHARD VARLEY, being a citizen of the United States, residing at Englewood, in the county of Bergen and State of New Jersey, have invented certain new and useful Improvements in Electric Controlling Devices for Automobiles, of which the following is a full, clear, and exact description.

The invention which forms the subject of this application for Letters Patent is an improvement in means devised primarily for giving either audible or visual signals or both, when, as in the case of such pieces of apparatus as automobiles, the ignition switch has been left on after the engine has ceased running. Experience has shown that this condition frequently arises through carelessness or negligence with the somewhat serious consequence of a useless depletion of the storage battery, and that the means for directing attention to its existence are not adequate for the purpose of preventing its occurrence. One of the main reasons for this failure I overcome by the provision of means for not giving the signals when the engine is running under its own power.

In this invention I take advantage of the fact that there is a marked increase in the voltage drop across the main brushes of the generator commutator when the generator is turning over at its minimum speed over the voltage drop across the brushes when the generator armature is stationary, a phenomenon well known to those skilled in the art. Internal combustion engines seldom or never rotate under their own power at a speed below 100 R. P. M. and as generators in this system are generally driven at 1½ crank speed, the minimum speed at which the generator armature can be driven by the engine is 150 R. P. M. At this speed there is very marked increase in the voltage drop across the main brushes over that when the generator is at rest, and even at slower generator speeds, when, for example, the engine is being turned over with the automatic starter or is being cranked by hand, there is a sufficient increase in the voltage drop across the brushes over that it attains when the generator is at rest to effect the result desired by me, namely, the energization of a solenoid connected in shunt to the brushes and operative to incapacitate an alarm circuit.

In its simplest form, my invention is adapted to the usual battery charging circuit, including the automatic cut-out switch of well known construction. These cut-out switches are of the electromagnetic type, there being both a voltage magnet coil, the energization of which follows the generated voltage, and a series magnet coil which is connected in series in the charging circuit. The armature controls the switch contacts which are normally held open by a spring and are closed when the generated voltage sufficiently surpasses the battery voltage, at which time the voltage coil is sufficiently energized to move the armature against the tension of the spring and so close the contacts.

When my invention is adapted to these cut-out switches, in order to provide a closed circuit for the battery through the brushes of the generator commutator and through the voltage coil in parallel, when the cut-out switch is open, I provide a shunt connection around the switch contacts, which shunt may be short-circuited by the closing of the contacts. A front contact on the armature will serve to close the alarm circuit, and a relatively light spring may be employed in combination with a stiffer spring to influence the armature to its open position. The feeble energization of the voltage coil by the battery current when the armature is running at low speed before charging voltage is attained will be sufficient to overcome the tension of the light spring and to attract the armature initially sufficiently to open the alarm circuit while the stiffer spring will restrain further movement of the armature to close the switch contacts until full charging voltage is attained.

It will be understood that my invention is not limited to association with an automatic cut-out switch, but may be incorporated in any magnet winding which, when the ignition switch is closed, is connected in circuit with the battery in parallel with the brushes of the generator commutator, the energization of the magnet winding serving to control the operativeness of an alarm device.

The difference in the voltage drop across the main armature brushes of a battery current flowing through the shunt above referred to during a stationary condition of the generator and when the generator is running at 150 R. P. M. is accounted for by the fact that the resistance between the carbon brushes and the moving commutator while current is passing, is greater than that between the brushes and a stationary commutator when current is passing, as it is now recognized that under running conditions the current gives rise to minute arcs under the brushes, which accounts in part for the drop, the remainder being due to the counter electro-motive force of the running armature in the field excited by the battery current passing through the said shunt and to the inductance in the generator armature coils when the current is reversing in them as they pass under the brushes. The shunt which I employ may be a simple one of proper resistance. I prefer, however, when my invention is adapted to the usual electrical cut-out switch, to use a special means for this purpose so as not to disturb the normal action of the regular windings, which I shall more fully hereinafter describe.

Prior to the closing of the main contacts the shunt which includes a coil on the core of the switch magnet, is in series with the heavy series winding of said switch, but the currents flowing around the core through the two coils are in opposition and as the number of turns in each coil is the same, the only flux in the switch core is that caused by the voltage winding.

I furthermore provide a switch, the center of which is connected to the battery, one end contacting with a button connected to the electrical switch, and the other with a button connected to the ignition system and to any part of a work circuit that it may be desirable to open while the engine is at rest.

The operation of this system and the manner in which the alarms are given may be more readily understood from the detailed description of the drawings which follows.

In the drawings hereto annexed:

Figs. 4, 5 and 6 are similar diagrams of the apparatus somewhat differently arranged and containing a vibrator in the field circuit of the generator for maintaining constant voltage after a certain speed has been attained.

Figs. 7 and 8 are diagrams illustrating in addition to the parts shown in Figs. 1 to 3, and 4 to 6, respectively, more of the work circuits and the visual signal mechanism not shown in those figures.

Figure 1:
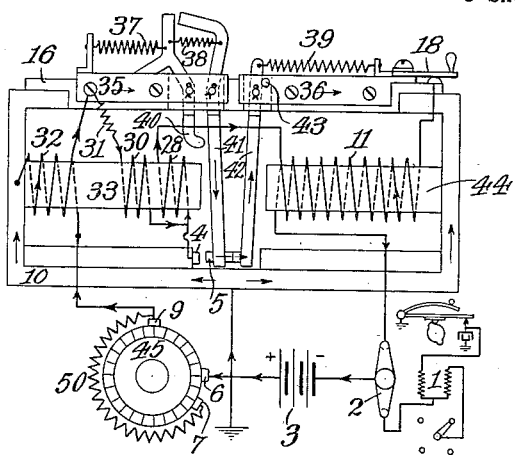
Fig. 1 is a diagrammatic illustration of the parts of an automobile with which the invention is directly concerned, where the generator is assumed to have a fixed shunt winding and exhibiting the conditions which exist when the generator is at rest.
Figure 2:
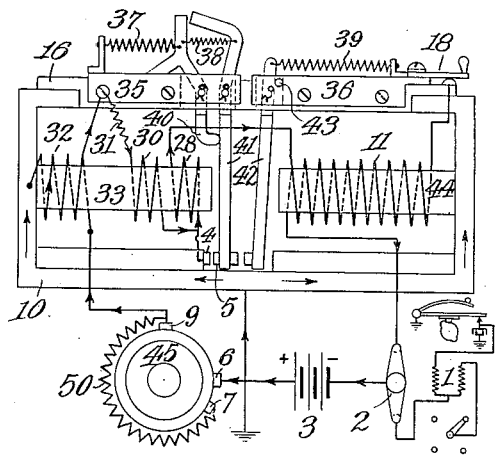
Fig. 2 is a similar diagram exhibiting the conditions which exist when the generator is running at some speed approximating, but less than, that when the battery is connected to the generator through the switch contacts.
Figure 3:
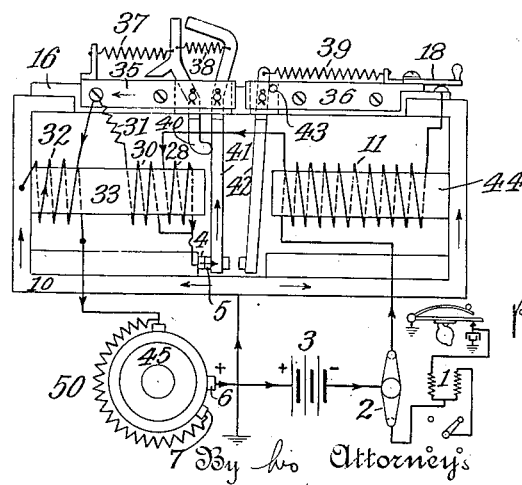
Fig. 3 is a third diagram exhibiting the conditions which exist when the generator is charging the battery.

In further explanation of the drawings it may be said, for example, of Figs. 1, 2 and 3, that they show by means of the arrows the direction of the currents, Fig. 1, with the generator at rest, Fig. 2 with the generator running at some speed approximately, but less than that when the battery is connected to the generator through the contacts of the electrical switch, and Fig. 3 with the generator charging the battery. In the last-named figure the voltage across the main brushes of the generator is in excess of the battery voltage. In Fig. 2 the drop across the main brushes is in excess of the drop when the generator is at rest.

Referring more particularly now to Figs. 1 to 3 and 7, 1 is the ignition system of an ordinary automobile in its entirety, and being well known requires no further description. A switch 2 simultaneously connects the battery 3 to the ignition apparatus and to the automatic electrical switch, in such manner that the energizing of the ignition circuit by the generator 45 is prevented when the battery is disconnected from the said ignition circuit. The automatic switch comprises a pivoted lever 41, a magnetic core 33 and two main contacts 4 and 5.

The generator is of the usual third brush type, one main brush 6 being grounded, the other 9 being connected to the circuit of the automatic switch, and the third 7 being connected through the field winding 50 with the brush 9. The frame of the automatic switch is also grounded. The brush 9 is connected to the voltage coil 32 of the switch, said coil being grounded through the frame 10. The coarse wire series winding of the core 33 is indicated by 28, while another coil or winding 30, preferably of oppositely wound, but of relatively fine copper wire as compared to the series winding 28, but having the same number of turns, also surrounds the core and is connected at one end to contact 4, and one end of coil 28, and at the other through a shunt resistance 31 to a support member 35, for the pivoted armature 41, and for a pivoted stop member 40, which serves to arrest the first movement of the lever 41. The support member 35 is mounted on an insulating bridge 16. The resistance 31 and the coil 30, together, constitute the shunt which I have added to the apparatus, the disposition of the resistance being for the purpose of preventing heating.

The stop member 40 above its pivotal connection with the supporting plate 35 is connected to a fixed support by a spring 37 that is of such strength as to yield only to a current set up around the core 33 when the voltage of the generator is of a value to meet the counter-electro-motive force of the battery. When the lever 41 under these circumstances is moved its full distance stretching spring 37 by moving the stop member 40, the points 4 and 5 are in contact and the current then flows from the generator to battery through the series winding 28, as indicated by the arrows in Fig. 3. The armature lever 41 is connected to the stop member 40 by a light spring 38 that is responsive to an extremely light current in the voltage winding 32, which is connected across the main brushes 6 and 9 of the generator. Such a current will therefore withdraw the lever 41 from contact with the lever 42, pivoted to the supporting plate 36, and maintain said lever in engagement with the stop member 40.

The lever 42 is the armature lever of the alarm circuit and in connection with the magnet core 44 constitutes a buzzer or audible alarm. It is held in its normal position against a stop 43 in the plate support 36 by a spring 39 and is operated by the magnetization of a core 44 wound with a coil 11. An emergency switch 18 is included in the alarm circuit and is kept normally closed.

The dash lamp and its switches are indicated at 46, Fig. 7. The switch controlling this dash lamp when thrown to the right, connects the lamp with the battery and ground through a resistance 49. When the switch is thrown to the left, the dash lamp is connected in parallel with the winding 11 of the alarm magnet and becomes lighted if the ignition switch is on and the engine at rest.

The resistance 49 is used for the purpose of having the same electro-motive force across the lamp in either position of the switch. Without this resistance the dash lamp would get full battery voltage which is higher than when the lamp is across the alarm winding 11.

The operation of the apparatus may now be readily understood by referring to Figs. 1, 2, 3 and 7. For example, in Fig. 1 the generator is assumed to be at rest but the switch 2 is on and connects the battery with the ignition system. The resistance between brushes 6 and 9 is the copper resistance only and is low, hence the battery current flows from 6 to 9 and thence direct to the supporting plate 35, down the armature lever 41, up the lever 42, across the supporting plate 36, and through the magnet coil 11, back to battery. This current energizes the said magnet and the armature 42 is thus set in vibration, operating as a buzzer or audible signal showing that the switch 2 is on but the generator is at rest.

Assume, however, that the generator is running at some speed less than normal. The voltage drop across the brushes 6 and 9 is increased with the result that there is an increase in the flow of battery current to the frame 10 through the coil 32, resistance 31, thence through the coils 30 and 28 in series, and thence back to battery. This energizes the core sufficiently to attract the armature 41 away from the alarm lever 42 until, as shown in Fig. 2, it rests against the stop lever 40, midway between the contact 4 and the lever 42. The buzzer or alarm is not therefore sounded as long as the generator is running.

Should the generator attain its normal running speed, then the coil 32 receives sufficient current to fully magnetize the core 33, and the lever 41 is drawn over until contacts 4 and 5 come together. In this case the shunt including coil 30 and resistance 31 is short-circuited and the full current of the battery flows directly through the switch 2 to and through the coil 28, through the lever 41, support member 35, and back to battery through the generator, as indicated by the arrows in Fig. 3.

Referring now to Fig. 7 and the parts shown therein and not included in the other figures, the lower right hand part of this figure shows the other lamp circuits as a whole. Included in these is a double bar five point switch shown in off position which is further utilized to advantage in conserving the battery current, as one member of the double bar is connected to the ignition switch 2, as shown in the diagram. When the engine stops running and the alarm is given, and the operator opens switch 2, the large head lights are simultaneously cut out but the small or "law" lamps are left burning until manually cut out. The law lamps are not under the control of switch 2, but the head light circuit is arranged so that the large lamps cannot be turned on without turning on the small or law lamps. This aviods the unconscious and unintentional violation of the traffic laws in the event of the engine power being turned off for any reason.

As the potential across the winding 11 of the alarm magnet is maximum when the generator is at rest, the tension of the spring 39 may readily be adjusted to so control the movement of the armature 42 as to maintain it inactive when the generator armature is turning and setting up a counter-electromotive force, thus reducing the potential of the alarm winding to such an amount that the pull on the armature 42 is less than that exerted by the retractile spring 39.

This results in the alarm being silent at practically all engine speeds where the engine is not running under its own power. Furthermore, when the alarm begins to sound, it is practically inaudible until the generator is at rest as the retractile spring 39 may be constructed so as to set the armature 42 in vibration only when the potential across the winding is very close to a predetermined amount.

If the alarm magnet be wound and adjusted to become active with a battery potential of from five to six volts in a three storage cell system, the alarm will be silent when the potential drop across the main brushes exceeds one volt, and this condition may be easily set up to occur at a crank shaft speed below that which the engine can maintain under its own power, even when idling.

In Fig. 7 there is also shown a suitable lamp 47 preferably, though not necessarily, connected in parallel with the resistance wire 31. Should this lamp be connected in series with said resistance and thus around the main contacts, the shunt would be destroyed upon the breaking of the lamp filament. By making the shunt across the main contacts 4 and 5 partly of wound turns of copper wire and about one fifteenth of the total resistance of the shunt, the use of this lamp as a special visual signal is rendered practicable in the manner shown. Such a lamp would be lighted when the switch 2 is in the "on" position and the generator is not charging the battery, the light being automatically extinguished whenever armature 41 is drawn forward sufficiently to close the main contacts 4 and 5, thus certifying to the proper working conditions of both the electrical switch and the generator.

Referring now to Figs. 4, 5, 6 and 8: In these figures parts corresponding to those in Figs. 1 to 3 and in Fig. 7 are similarly numbered with designating numerals and, hence, require no further description. I have shown, however, in connection with the core 33, which in these figures is at the right hand side of the diagram, a core 34 of a voltage regulator magnet. On this core is a voltage coil 13, and a reversely wound coil 12. The insulating bridge-piece 16 of the frame 10 has in this case a single supporting conducting member 15 to which are pivoted the armature lever 27 of the automatic switch controlling the two contacts 4 and 5, the armature lever 26 of the voltage regulator and the stop member 25 which cooperates with the lever 26.

A spring 17 is connected to a fixed stop and to the stop member 25 and is responsive only to the current set up by the generator in the voltage winding 13, and serves to keep the voltage at a predetermined maximum safe value. A second spring 19 is connected to a fixed stop and to the armature lever 26 and this spring is responsive to an extremely light current in voltage winding 13 which it will be noted is connected across the main brushes 6 and 9 of the armature of the generator. This spring serves to maintain contacts 22 and 23 in the alarm winding circuit closed when the engine is at rest.

Other parts of the device are an insulated terminal 8 in the generator shunt circuit; a high resistance 14 shunting the voltage regulator contacts; an auxiliary emergency switch 18 in the alarm circuit which is kept normally closed; contacts 20, 21 in the voltage regulator circuit, which when closed short-circuit the reversely wound coil 12, and a thin leaf spring 24 connected to the alarm contact 23 which causes the actual breaking of the alarm circuit to lag behind the attracted movement of the armature 26.

The operation of the device thus described is as follows:

Assuming the switch 2 to be in the "on" position completing the ignition circuit and the generator at rest, the grounded terminal of the battery is also connected to the main generator brush 6 and to the frame 10 of the device. Under these conditions the circuit is then complete to the plate or member 15, through four parallel paths, one through the generator at rest; another through the field coil 50 of the generator and across engaging contacts 20 and 21 and stop member 25; another through voltage coil 13, and the fourth through the voltage coil 32 of the switch controlling magnet.

The circuit from this point is then completed to the opposite pole of the battery through two or more parallel paths, one being from the plate 15 to the armature lever 26, through the leaf spring 24, across contacts 22, 23, to switch 18, through the alarm winding 11 to the upper contact of switch 2. The other path to battery from the plate or member 15 is through the resistance wire 31 of the shunt, the winding 30 to the heavy series winding 28 to the upper contact of the switch 2. The armature 26 of the magnet core 34 is thus subject to vibration, being attracted by the said core and then released by the separation of contacts 22 and 23. This acts as a buzzer to give an audible signal.

While the generator 45 is at rest, as shown in Fig. 4, the voltage windings 13 and 32 are both practically short circuited and hence have no perceptible influence upon either of the armatures 26 or 27, and do not overcome the tension of the springs 19 or 29. The noise of the vibrating armature lever 26 will persist, however, until the switch 2 is opened or until the engine turns the generator at a speed to cause a voltage drop in the battery circuit across the main brushes 6 and 9 sufficient to increase the current in voltage winding 13, that will result in the magnet 34 attracting the armature 26 and overcoming the tension of the spring 19, the condition shown in Fig. 5.

When the armature 26 is moved towards its magnet it is at first arrested by the stop 25 to which the spring 17 is connected and exerting a force which holds contacts 20 and 21 in engagement. This spring has a tension which permits the stop 25 to move and the contacts to open only at a predetermined voltage greater than that required for charging purposes; hence, when the contacts are opened by such excess voltage, the field of the generator 45 is weakened for an instant until the contacts are again brought together by the current in the reversely wound coil 12, demagnetizing the core 34. Sparking at these contacts is prevented by a suitable resistance 14 shunting the reverse winding 12. This rapid and automatic opening and closing of the contacts 20 and 21 maintains a constant generator voltage in a manner well known, and although this feature forms no part of my present invention, I take advantage of the fact that the alarm is not active when voltage regulation is required to make the core 34, the voltage winding 32, the frame 10, the armature 41, and the member 15 common to both devices.

With a three cell six volt system the contacts 20 and 21 are usually maintained in engagement by the spring 17 until the potential across brushes 6 and 9 is about eight volts. Prior to that and at or about six and one-half volts, the armature 27 closes the main contacts 4 and 5, short circuiting the shunt containing resistance wire 31 and the winding 30.

With the exceptions above noted in connection with the description of Figs. 4 to 6, Fig. 8 is similar in all respects to Fig. 7 and requires no further detailed description.

Having now described my invention, what I claim is:

1. In an indicator a magneto-electric device including a rotor, cooperating brushes, a working circuit connected to the brushes and a switch therein, a source of potential, a circuit including indicating means, means for applying potential from said source to said brushes and means responsive to the drop of potential across the brushes and rotor due to the rotation of the latter while the working circuit switch is open and the said potential is applied to said brushes for incapacitating said indicator circuit.

2. An automatic indicator for automobile battery charging systems comprising a generator including a relatively rotative armature and cooperative brushes, a storage battery, an indicator circuit, a circuit to connect the battery and generator in charging relation including a switch, a shunt around said switch providing a closed circuit between the battery and generator when the said switch is open and thereby cause the battery potential to be applied to said brushes, a coil connected in shunt with the generator brushes, and means operated by said coil responsive to an increase of voltage drop across the brushes due to relative rotation of the armature when the battery potential is being applied to the brushes to incapacitate the indicator circuit.

3. An automatic indicator for automobile battery charging systems comprising a generator including a relatively rotative armature and cooperative brushes, a storage battery, an indicator circuit, a circuit to connect the battery and generator in charging relation including a switch, means for applying the battery potential to the said brushes when the charging circuit is open, and an electromagnetic device in control of the indicator circuit and responsive to an increase of voltage drop across the brushes due to relative rotation of the armature when the battery potential is being applied to the brushes to incapacitate the indicator circuit.

4. An automatic indicator for automobile battery charging systems, comprising a generator including a relatively rotative armature and cooperative brushes, a storage battery, an indicator circuit, a circuit to connect the battery and generator in charging relation including a switch, a shunt around said switch providing a closed circuit between the battery and generator when the said switch is open and thereby causing the battery potential to be applied to said brushes, said shunt being arranged to be short-circuited when the said switch is closed, a coil connected in shunt with the generator brushes, and means operated by said coil responsive to an increase of voltage drop across the brushes due to relative rotation of the armature when the battery potential is being applied to the brushes to incapacitate the indicator circuit.

5. An automatic indicator for automobile battery charging systems comprising a generator including a relatively rotative armature and cooperative brushes, a storage battery, an indicator circuit, a circuit to connect the battery and generator in charging relation including a switch, a series solenoid in the charging circuit for holding the switch closed, a shunt around said switch providing a closed circuit between the battery and generator when the said switch is open and thereby causing the battery potential to be applied to said brushes, said shunt including a resistance and a winding having as many turns as said series solenoid but so connected that when energized its magneto-motive force opposes the magneto-motive force of the series solenoid and arranged to be short circuited when the said switch is closed, and a coil in control of the indicator circuit connected in shunt with the generator brushes and responsive to an increase of voltage drop across the brushes due to relative rotation of the armature when the battery potential is being applied to the brushes to incapacitate the indicator circuit.

6. An automatic indicator for automobile battery charging systems comprising a generator including a relatively rotative armature and cooperative brushes, a storage battery, an indicator circuit, a circuit to connect the battery and generator in charging relation including a switch, a series solenoid in the charging circuit for holding the switch closed, a shunt around said switch providing a closed circuit between the battery and generator when the said switch is open and thereby causing the battery potential to be applied to said brushes, said shunt including a resistance and a winding having as many turns as said series solenoid but so connected that when energized its magnetomotive force opposes the magneto-motive force of the series solenoid and arranged to be short circuited when the said switch is closed, and a coil arranged in control both of the indicator circuit and of the said switch and connected in shunt with the generator brushes and in the said closed circuit between the battery and generator when the said switch is open and responsive to generator potential to close the said switch and to an increase of voltage drop across the brushes due to relative rotation of the armature when the battery potential is being applied to the brushes to incapacitate the indicator circuit.

In testimony whereof I hereto affix my signature.

RICHARD VARLEY.